United States Patent [19]

Maeda

[11] Patent Number: 4,502,757

[45] Date of Patent: Mar. 5, 1985

[54] LIGHT BEAM DISTRIBUTOR AND AN ACOUSTO-OPTIC LIGHT MODULATING ELEMENT

[75] Inventor: Kiyoshi Maeda, Takatsuki, Japan

[73] Assignee: Dainippon Screen Manufacturing Co., Ltd., Kyoto, Japan

[21] Appl. No.: 395,438

[22] Filed: Jul. 6, 1982

[30] Foreign Application Priority Data

Jul. 14, 1981 [JP] Japan ................ 56-110440

[51] Int. Cl.³ .................... G02B 27/10; G02B 5/04
[52] U.S. Cl. .................................. 350/173
[58] Field of Search ............ 350/173, 171, 169, 170, 350/172, 174, 299, 291, 358, 388, 286

[56] References Cited

U.S. PATENT DOCUMENTS 1,787,269 12/1930 Hansen .................... 350/173
4,358,200 11/1982 Heemskerk et al. .......... 350/172

FOREIGN PATENT DOCUMENTS

| 47701 | 1/1977 | Japan ................ 350/171 |
| 362622 | 12/1931 | United Kingdom . |
| 470653 | 8/1937 | United Kingdom ........ 350/173 |
| 1338646 | 11/1973 | United Kingdom . |
| 1522555 | 8/1978 | United Kingdom . |
| 1539459 | 1/1979 | United Kingdom . |

OTHER PUBLICATIONS

Yu. I. Ostrovskii, *Optics and Spectroscopy*, vol. XXI, No. 5, Nov. 1966, pp. 342–343.

Douglas L. Franzen, *Applied Optics*, vol. 14, No. 3, Mar. 1975, pp. 647–652.

*Primary Examiner*—Jon W. Henry
*Attorney, Agent, or Firm*—Millen & White

[57] ABSTRACT

A light beam distributor comprises a light transmitting block defining a pair of wedgewise opposed surfaces so that a single incident light beam is split and emitted into a plurality of light beams from one surface while it is repeatedly reflected between the pair of surfaces.

3 Claims, 2 Drawing Figures

LIGHT BEAM DISTRIBUTOR AND AN ACOUSTO-OPTIC LIGHT MODULATING ELEMENT

TECHNICAL FIELD

The present invention relates to a light beam distributor, and more particularly, it relates to the beam distributor associated with a recording unit of an image scanning and recording system.

BACKGROUND ART

In image scanning and recording systems of the type having a plurality of light modulating elements in its recording unit for independently modulating incident light into a plurality of modulated light beams in response to image signals from the scanning unit to duplicate and record halftone images on a recording material, it is necessary for a light beam from a light source, such as laser, to split into a plurality of light beams and to direct them to the respective light modulating elements.

Light beam distributors of this type are known and include one disclosed in Japanese Patent Application Disclosure No. 122135/1977. The disclosed light beam distributor, as shown in FIG. 1, is in the form of a block 3 made of light transmitting material whose opposed face 1 and back 2 have parallel surfaces. The face 1 has vapor-deposited thereon a coating which reflects part of light while allowing part of it to pass therethrough. The back 2 has applied thereto a coating which provides an increased reflecting power, so that a light beam reflected on the face 1 is allowed to repetitively reflect, as shown in FIG. 1. As a result, a plurality of parallel light beams $I_1, I_2, I_3, I_4$, are obtained from the face 1.

The light beam distributor disclosed in said Japanese Patent Application Disclosure No. 122135/1977 operates by allowing such a plurality of light beams to fall upon a corresponding plurality of electro-optic light modulating elements, independently modulating them by said light modulating elements in response to image signals, and projecting the plurality of modulated light beams on a photosensitive material as rows of tiny light spots to successively form halftone dots, thereby duplicating and recording halftone images.

However, since the plurality of light beams from such light beam distributor are parallel light beams, if the number of split light beams is increased, it is necessary to correspondingly increase the diameter of the subsequently arranged optical system.

SUMMARY OF THE INVENTION

Accordingly, to avoid this problem the present invention provides a light beam distributor in which its face and back are arranged in a wedgewise opposed to each other configuration, allowing the plurality of light beams emitted from said light beam distributor to converge so as to make it possible to reduce the diameter of the subsequent optical system following the light beam distributor, and thus providing for reduction of the size of the device.

DETAILED DESCRIPTION OF THE INVENTION

Figure 1:
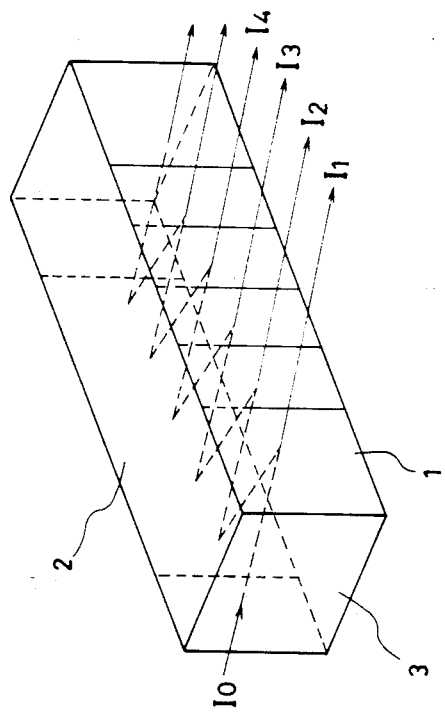
FIG. 1 schematically illustrates the light beam distributor of the prior art previously discussed.
Figure 2:
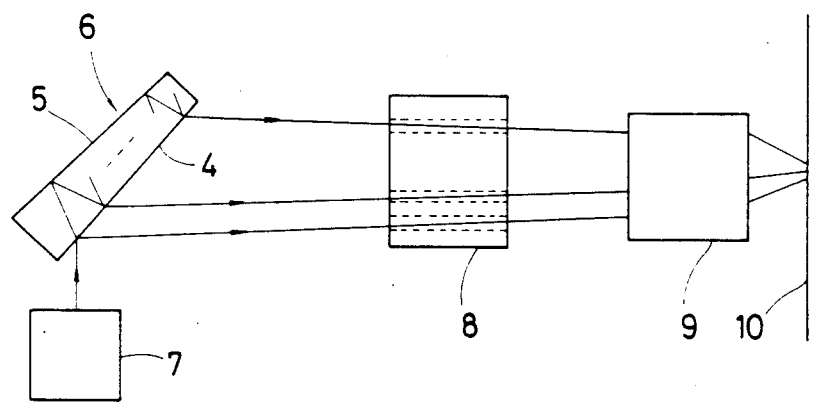
FIG. 2 schematically illustrates the light beam distributor of the invention incorporated into an image scanning/recording system.

Now the invention will be described in detail by making reference to the drawings. As discussed, FIG. 2 shows an embodiment wherein a light beam distributor 6 according to the present invention is incorporated in an image scanning and recording device. A light beam from a light source 7 is reflected in the light beam distributor 6 in such a manner that it is repetitively reflected, split and emitted by the face 4 having a light transmitting-reflecting coating and back 5 having a light reflecting coating (the transmitting coating being changed in thickness to equalize the attenuation rates of the outgoing light beams). These light beams are emitted in converging directions and fall upon a multichannel light modulating element 8, i.e., an acousto-optic light modulating element including a plurality of ultrasonic wave exciting portions arranged side by side on a single acousto-optic medium to independently modulate a plurality of incident light beams, wherein said light beams are independently modulated by the plurality of independently operating ultrasonic wave exciting portions. The modulated light beams then fall upon a focussing lens system 9 to form rows of tiny light spots on a photosensitive material 10.

Particularly, since the light beam distributor 6 is in wedge form, the light beams converge, thus allowing the diameter of the focusing lens system 9 to be reduced, so that the device can be made small in overall size.

If parallel beam rows obtained by using conventional perfectly parallel separating plates are scale-down projected, the beam rows simply become (1/scale-down ratio), with clearances being formed between adjacent beams for projected images. In contrast, in the present invention, since the beams each have an angle primarily determined by the angle of the wedge, it is easy to obtain an image in which the beams are closely adjacent to each other, by suitably selecting the beam diameter and said determined angle. Scale-down focusing this image by the focusing lens system will provide the advantage that an image rotating system necessary for said parallel beams is not required.

Since the emitted light beams converge, the diameter of the optical system disposed subsequent to the light beam distributor can be reduced, so that the device can be made smaller in size as a whole.

With the light beam distributor according to the invention used, since the emitted light beams differ a little in angle from each other, upon passage through the focusing lens system 9, they form a row of light spots in focus at spaced positions, so that a rational row of light spots is formed in contrast to the fact that parallel light beams obtained by using a conventional perfectly parallel light beam distributor are focused at a point after passing through the focusing lens system 9, and hence make it necessary to bring them more or less out of focus.

The above has been offered for illustrative purposes only, and it is not for the purpose of limiting the scope of this invention which is defined in the claims below.

I claim:

1. An optical system comprising: a light distributor, said distributor comprising a light transmitting block having a pair of opposed surfaces arranged in wedgewise configuration whereby when a single incident light beam is transmitted onto one surface thereof and into said distributor, the beam is split into a plurality of light beams emitted from the one surface as a result of repeated internal reflections between said pair of surfaces; laser light source means for emitting a laser beam positioned on one side of said light transmitting block for having a laser light beam therefrom intersect the one of said opposed surfaces of said block at an angle smaller than the angle at which the light beam impinges on the other of said opposed surfaces; and an acousto-optic light modulating element having a plurality of ultrasonic wave exciting portions arranged side by side, said modulating element disposed on the same side of the block as said laser light source means for having a plurality of converging split beams generated by said block from a laser beam from said laser light source means independently impinge respectively on said plurality of wave exciting portions.

2. A system as in claim 1, wherein said light distributor one surface has a coating changing in thickness in a manner for equalizing the attenuation rates of said plurality of split light beams, while the other surface has a coating for improving the internal reflection of said incident light beam.

3. A system as in claim 1, wherein said light distributor other surface has a coating of greater reflecting power toward the inside of the block than the reflective coating on the inner face of the one surface.

* * * * *